United States Patent
Robson

(10) Patent No.: US 11,916,652 B2
(45) Date of Patent: Feb. 27, 2024

(54) METHOD OF, AND APPARATUS FOR, IMPROVED SATELLITE COMMUNICATIONS

(71) Applicant: METHERA GLOBAL COMMUNICATIONS LIMITED, Didcot (GB)

(72) Inventor: David Robson, Didcot (GB)

(73) Assignee: METHERA GLOBAL COMMUNICATIONS LIMITED, Didcot (GB)

(*) Notice: Subject to any disclaimer, the term of this patent is extended or adjusted under 35 U.S.C. 154(b) by 166 days.

(21) Appl. No.: 17/278,134

(22) PCT Filed: Sep. 20, 2019

(86) PCT No.: PCT/EP2019/075401
§ 371 (c)(1),
(2) Date: Mar. 19, 2021

(87) PCT Pub. No.: WO2020/058503
PCT Pub. Date: Mar. 26, 2020

(65) Prior Publication Data
US 2022/0006513 A1    Jan. 6, 2022

(30) Foreign Application Priority Data
Sep. 21, 2018 (GB) ..................... 1815441

(51) Int. Cl.
*H04B 7/185* (2006.01)
*H04B 7/195* (2006.01)
(Continued)

(52) U.S. Cl.
CPC ..... *H04B 7/18528* (2013.01); *H04B 7/18517* (2013.01); *H04B 7/195* (2013.01); *H04B 7/2041* (2013.01); *H04W 84/06* (2013.01)

(58) Field of Classification Search
None
See application file for complete search history.

(56) References Cited

U.S. PATENT DOCUMENTS

| 5,896,558 A | 4/1999 | Wiedman |
| 7,020,462 B1 * | 3/2006 | Wesel ................. H04B 7/2041 455/12.1 |

(Continued)

FOREIGN PATENT DOCUMENTS

EP     0 883 252 A2    12/1998

OTHER PUBLICATIONS

International Search Report dated Dec. 10, 2019 in corresponding International Application No. PCT/EP2019/075401.
(Continued)

*Primary Examiner* — Shripal K Khajuria
(74) *Attorney, Agent, or Firm* — MEDLER FERRO WOODHOUSE & MILLS PLLC

(57) ABSTRACT

There is provided a satellite network for data communication, the network comprising a plurality of satellites arranged in medium Earth orbit (MEO) in a plurality of orbital planes such that a plurality of satellites are provided in each orbital plane, each satellite being operable to communicate with at least one terrestrial user terminal and comprising at least one communications antenna operable to generate a spot beam on a predetermined selected terrestrial region to enable said one or more terrestrial user terminals to receive and/or send data via the spot beam. The plurality of satellites is arranged such that the spot beams of at least two satellites are operable to cover the same terrestrial region at any one time.

17 Claims, 10 Drawing Sheets

(51) Int. Cl.
*H04B 7/204* (2006.01)
*H04W 84/06* (2009.01)

(56) References Cited

U.S. PATENT DOCUMENTS

| | | | |
|---|---|---|---|
| 8,712,321 B1 | 4/2014 | Dankberg | |
| 2015/0280810 A1* | 10/2015 | Beals | H04B 7/1851 |
| | | | 455/13.1 |
| 2018/0006370 A1* | 1/2018 | Hreha | H04B 7/1851 |

OTHER PUBLICATIONS

Examination Report dated Mar. 18, 2019 in corresponding United Kingdom Application No. 18 15 441.9.
Hughes Network Systems, "The View from Jupiter: High-Throughput Satellite Systems", Jul. 2013, www.hughes.com/sites/hughes.com/files/2017-04/JUPITER_H50283_HR_08-01-13.PDF [Accessed Mar. 13, 2019].
Swinford, R. et al.; Arthur D Little, "High Throughput Satellites: Delivering future capacity needs," 2015, www.avantiplc.com/wp-content/uploads/2018/08/ADL_High_Throughput_Satellites-Main_Report.pdf [Accessed Mar. 13, 2019].

* cited by examiner

METHOD OF, AND APPARATUS FOR, IMPROVED SATELLITE COMMUNICATIONS

The present invention relates to an improved method of, and apparatus for, satellite communication. More particularly, the present invention relates to a satellite-based communication system using a medium Earth orbit (MEO) satellite constellation.

Broadband internet based services are becoming indispensable for many areas of modern life and is coming to be considered as a utility. In such circumstances, a utility is generally regulated by particular enforced standards of availability or quality. For example, the provision of clean drinking water is a classic utility that is essential for the health of the general population. It must meet publicly enforced standards for quality and availability.

The provision of broadband connectivity, by contrast, is not essential for human existence. However, it can be argued that such services enhance the quality of life for many individuals.

However, the definition of broadband is ever evolving in a direction that requires ever-greater data speeds. This is primarily to feed demand for high-bandwidth requirements such as video and emerging virtual reality-based content.

Such demand means that investment in such technology is generally concentrated in areas where there is demand and the possibility of the greatest return. As a result, a large proportion of investment in improved services is concentrated on regions of high population density and wealth.

Delivering high-speed broadband quickly and at an effective cost to any community that may need it is a technical challenge that has yet to be addressed satisfactorily by known arrangements and structures.

Many techniques for providing digital connectivity to mobile and stationary users are known. However, there are a significant number of limitations with each solution in the context of high-speed broadband.

Delivery of broadband services through mobile telecommunication systems is well known. In many developed countries, technologies such as 3G, LTE and 4G are common and can, in certain circumstances, deliver broadband services of a quality and speed comparable to land-based implementations.

However, across much of Africa and in other developing countries, the absence of a widely available wired telephony service has meant that the growth in digital communications has been achieved predominantly on the GSM mobile telephone platform. Companies that understood affordability in simple terms, such as goat ownership, pioneered the rapid and organic growth in the use of 2G mobile communications in Africa.

Subsequent development of 3G and 4G mobile communications has enabled delivery of broadband to anyone who can afford a suitable device (e.g. smartphone or other content delivery device). Network base stations are installed in a cell structure to supply users with network connectivity. However, in general, the limiting factor is the availability of suitable radio spectrum. Mobile networks typically use a few MHz in the UHF and L-bands to carry digital content. To a first approximation, each MHz can support a data stream of about 2 Mbps.

As a result, there is clearly a limit to the number of simultaneous users a given base station can support at a given data rate. The higher the data rate, the fewer simultaneous users can use a particular base station. Therefore, to support more users, more base stations are required, each of which has to operate at a different frequency than neighbouring base stations to avoid problems with coverage areas overlap. In addition, as with wired ground-based communications, the operators tend to focus growth in the more densely populated areas.

However, a significant advantage of mobile broadband system is that the user is offered a "plug-and-play" simplicity. In addition, mobile technology supports services to small inexpensive terminals (e.g. smartphones) that can be used on the move. In developed countries, such as the UK, these systems cover about 90% of the population but the disadvantage is that there is a limit to the data rates that can be offered and cost of the fixed infrastructure means that isolated communities may not be served at all.

An alternative is the "Wifi" wireless networking system. This technology is aimed primarily at supporting local area networking. It is inexpensive to implement and is now ubiquitous, operating around 2.4 GHz and able to carry digital content at 54 Mbps. It is used primarily for interconnecting routers, computers, printers and similar devices that can be moving relative to each other. However, while the system can operate over a distance of about 100 m in ideal (line-of-sight) conditions, communication is usually lost at shorter distances because of RF signal attenuation through walls and ceilings.

The known "Wimax" system is similar in concept but has been engineered to provide longer-range connectivity. In concept this is similar to a point-to-point microwave link. Using high-gain fixed antennas and operating at around 2 GHz and 11 GHz it can provide high-speed connectivity over distances up to 80 km in ideal conditions. Wimax is aimed at providing an alternative to mobile telephony systems (3G, 4G etc.) for consumers with limited or no broadband access or as a competitor to basic fixed wire connections.

However, as with any terrestrial based Radio Frequency (RF) communications system it has to compete for limited access to suitable spectrum and this limits the available data speeds and the number of simultaneous users that a mast or base station can support.

For most developed urban and sub-urban areas the broadband connection system of choice is via fixed cable to the home. The cables may be standard telephone lines or co-axial connections that may have been deployed originally for TV. Both systems use such cables to connect clusters of users to a street cabinet, which is itself connected to the main network via optical fibre or fixed wireless link. In very dense environments the users may be connected to the main network directly via optical fibre. The service providers are able to offer a range of connection speeds and monthly data volumes at competitive prices.

A key feature of fixed-line systems, compared to wireless delivery, is the fact that the data is contained within fibres and cables. This means that there is no spectrum constraint on the ability to expand the service by simply adding more cables and fibres. By contrast, wireless systems of any type have to operate within specified and limited allocations of RF spectrum, to enable neighbouring services to co-exist without mutual interference. Although fixed-line systems need not be constrained by spectrum use, the number of simultaneous users will always be limited by the amount of hardware employed in the core network.

The significant disadvantage of fixed line systems is the time required and cost of installing the fixed infrastructure (exchanges, cable trunking, street cabinets etc.). This may dissuade installation of such systems in remote areas with low population densities since the installation costs may not justify the investment.

A further category is the use of satellite communication systems. These systems are able to operate worldwide. They are an essential element in the broadcast of TV and navigation services direct to the consumer and are the primary means of communication with vessels on the high seas.

There are three general categories of systems in common use: Geosynchronous Earth Orbit (GEO), Low Earth Orbit (LEO) and Medium Earth Orbit (MEO).

GEO systems have been in common use since the 1980s. They quickly became the system of choice for the delivery of TV and, more recently high definition TV. However, such systems are less popular for high-speed digital broadband.

GEO satellites appear in a fixed position in the sky. User equipment requires a high-gain (directional) antenna to communicate with the satellite, which orbits about 36000 km from the Earth. The antenna may be fixed but requires some skill to make the initial setup since it is large (typically 72 cm diameter at Ka band) to avoid interference to and from neighbouring GEO satellites.

A GEO single satellite can, in theory, provide a communication service across a third of the globe (where three satellites are required for non-polar global coverage). The digital content flowing to and from each satellite is connected to the wider global communications network via at least one large ground-terminal (Gateway) that requires substantial RF spectral bandwidth to handle the volume of traffic.

A typical packet of data will take about 0.25 seconds to travel from network to user and another 0.25 seconds from user to network. This delay or latency may limit the type of digital service that can be supported. An example of a modern GEO system that has been optimised for high-speed digital applications (HDTV, Broadband etc.) is YahSat.

However, whilst GEO satellites are able to provide a large capacity, such capacity is spread thinly over the selected coverage area. To increase capacity in one location larger antennas can be used on the satellite to reduce the size of the cell. Alternatively a large satellite operator may have access to several GEO orbital slots and increase capacity in one place by a small factor.

In addition, GEO systems tend to organise the use of satellite resources to optimise coverage area, and hence the number of potential users. High value users, such as cruise ships, are able to afford complex receiver systems that can maintain antenna pointing to the satellite as the ship moves. Domestic users only need fixed antennas but the initial setup requires specialist personnel, as the setup requires precise mechanical alignment and is considered to be too difficult for a DIY installation. The fact that all GEO satellites occupy a single orbital plane restricts the ability for frequency reuse between systems.

LEO systems, by contrast, were initially aimed at scientific and Earth observation applications. With the development of digital communications technology it became possible to deploy them in mobile telephony and broadband applications for consumers worldwide. Orbiting once every 90 minutes or so and at a height up to 1500 km the satellites appear to move across the sky from horizon to horizon in about 10 minutes.

The low orbital height of such satellites obviates the need for a directional user antenna for low bandwidth services and has the advantage of lower system latency and lower launch cost. A constellation of many satellites and a corresponding large number of Gateway locations spread across the globe is required to deliver a continuous service to any user. Alternatively inter-satellite links may be used to reduce the required number of gateway locations.

However, for high bandwidth services directional antennas are required at the user terminals. Typical diameters will be in the range 30 to 60 cm in $K_a$ or $K_u$ band. Because of the rapid angular rate of the satellites the user has to be able to rapidly steer multiple (at least 2) beams to separate satellites to maintain the service.

In addition, because LEO satellites are so close to the Earth, any one user can only see a small fraction (below 1% with a 1200 km altitude orbit) of the satellite constellation. This means that below 1% of the constellation capacity can be concentrated in one area and like with GEO the capacity is thinly spread.

MEO systems do not provide an apparently stationary communications link, as with GEO, nor do they offer the advantages of close range communication provided by LEO.

Therefore, whilst MEO systems are known in the field of global satellite navigation, to date they are not routinely used to implement telecommunication services such as broadband to all parts of the globe including at high latitudes.

Therefore, there exists a technical problem in the art that known systems and techniques for provision of broadband services have significant drawbacks when considering remote areas or areas of low or growing population density. Aspects of the invention, in embodiments, address these issues.

According to a first aspect of the present invention, there is provided a satellite network for data communication, the network comprising a plurality of satellites arranged in medium Earth orbit (MEO) in a plurality of orbital planes such that a plurality of satellites are provided in each orbital plane, each satellite being operable to communicate with at least one terrestrial user terminal and comprising at least one communications antenna operable to generate a spot beam on a predetermined selected terrestrial region to enable said one or more terrestrial user terminals to receive and/or send data via the spot beam, wherein the plurality of satellites is arranged such that the spot beams of at least two satellites are operable to cover substantially the same terrestrial region at any one time.

In one embodiment, the plurality of satellites is arranged such that the spot beams of at least two satellites in at least two different orbital planes are operable to cover substantially the same terrestrial region at any one time.

In one embodiment, each satellite is operable to communicate with at least one terrestrial gateway terminal and each satellite comprises at least one gateway antenna operable to generate a gateway spot beam on a predetermined selected terrestrial gateway region to enable said one or more terrestrial gateway terminals within said gateway region to receive and/or send data via the gateway spot beam.

In one embodiment, each satellite comprises a plurality of gateway antennas, each gateway antenna being operable to generate a gateway spot beam on a different predetermined selected terrestrial gateway region to enable one or more terrestrial gateway terminals within each of said terrestrial regions to receive and/or send data via the gateway spot beams, said predetermined selected terrestrial gateway regions being spatially separated from one another.

In one embodiment, each satellite comprises three or more gateway antennas, the gateway antennas being operable to generate at least three gateway spot beams on at least three different and spatially separated predetermined selected terrestrial gateway regions to enable one or more terrestrial gateway terminals within each of said terrestrial gateway regions to receive and/or send data via the gateway spot beams, wherein the terrestrial gateway terminals within any two terrestrial gateway regions are active at any one time.

In one embodiment, each gateway antenna and each communications antenna on a given satellite are configured, in use, to generate spot beams on spatially separated geographical regions.

In one embodiment, the or each gateway antenna on each satellite is operable to generate a spot beam covering a region having a longest dimension of approximately 50 to 300 km in nadir. In one embodiment, the or each gateway antenna on each satellite is operable to generate a spot beam covering a region having a longest dimension of approximately 125 to 175 km in nadir.

In one embodiment, a plurality of gateway antennas within the network are arranged to operate on the same frequency or band of frequencies. In one embodiment, a plurality of gateway antennas within the network and a plurality of communications antennas within the network are arranged to operate on the same frequency or band of frequencies.

In one embodiment, the or each communications antenna on each satellite in the network is arranged to operate on the same frequency or band of frequencies.

In one embodiment, each satellite further comprises a gateway antenna and the or each gateway antenna on each satellite in the network is arranged to operate on the same frequency or band of frequencies.

In one embodiment, the or each gateway antenna on each satellite in the network and the or each communications antenna on each satellite in the network is arranged to operate on the same frequency or band of frequencies.

In one embodiment, the or each satellite is arranged to operate in the $K_a$ band of frequencies.

In one embodiment, the or each satellite in the network is configured to transmit and/or receive data in two different beam polarisations. In one embodiment, the polarisations are circular polarisations.

In one embodiment, the plurality of satellites are provided in four or more orbital planes. In one embodiment, 8 to 16 satellites are provided in each orbital plane.

In one embodiment, the satellites within an orbital plane have an unequal spacing. In one embodiment, the satellites within an orbital plane are pseudo-randomly spaced.

In one embodiment, the angle between two orbital planes is 45 degrees with respect to the polar axis.

In one embodiment, the or each communications antenna on each satellite is operable to generate a spot beam covering a region having a longest dimension of approximately 50 to 300 km in nadir.

In one embodiment, the or each communications antenna on each satellite is operable to generate a spot beam covering a region having a longest dimension of approximately 125 to 175 km in nadir.

In one embodiment, the or each communications antenna on each satellite is operable to generate a spot beam covering a region having a longest dimension of approximately 150 km in nadir.

In one embodiment, a plurality of communications antennas within the network are arranged to operate on the same frequency or band of frequencies.

In one embodiment, the or each communications antenna on each satellite is operable to generate a spot beam on a selected terrestrial region having an angular width of 0.4 degrees.

In one embodiment, the or each gateway antenna on each satellite is operable to generate a spot beam on a selected terrestrial region having an angular width of 0.4 degrees.

In one embodiment, each of the plurality of satellites is arranged at an orbital altitude of between 17000-23000 km.

In one embodiment, each of the plurality of satellites is arranged at an orbital altitude of between 19000-20000 km.

According to a second aspect of the present invention, there is provided a method for satellite communication, comprising: a) providing a plurality of communication satellites arranged in a medium Earth orbit (MEO) in a plurality of orbital planes such that a plurality of satellites are provided in each orbital plane, each satellite being operable to communicate with at least one terrestrial user terminal; and b) generating, using at least at least one communications antenna on at least one satellite, a spot beam on a selected terrestrial region to enable a user terminal in said selected terrestrial region to receive and/or send data via said spot beam, wherein the plurality of satellites is arranged such that the spot beams of at least two satellites are operable to cover the same terrestrial region at any one time.

In an embodiment, there is provided a satellite network for data communication, the network comprising a plurality of satellites arranged in medium Earth orbit (MEO) and in at least one orbital plane and operable to communicate with at least one terrestrial user terminal, each satellite comprising at least one communications antenna operable to generate a spot beam on a selected terrestrial region to enable said one or more terrestrial user terminals to receive and/or send data via the spot beam, wherein the spot beam is operable to cover a region having a longest dimension of approximately 50 to 300 km in nadir.

In embodiments, there is provided a satellite network for data communication, the network comprising a plurality of satellites arranged in medium Earth orbit (MEO) and in at least one orbital plane and operable to communicate with at least one terrestrial user terminal, each satellite comprising at least one communications antenna operable to generate a spot beam on a selected terrestrial region to enable said one or more terrestrial user terminals to receive and/or send data via the spot beam, wherein the spot beam has an angular width in the range of 0.2 to 2 degrees.

In embodiments, there is provided a satellite network for data communication, the network comprising a plurality of satellites arranged in medium Earth orbit (MEO) in a plurality of orbital planes and operable to communicate with at least one terrestrial user terminal, each satellite comprising at least one communications antenna operable to generate a spot beam on a predetermined selected terrestrial region to enable said one or more terrestrial user terminals to receive and/or send data via the spot beam, wherein each satellite comprises a plurality of gateway antennas, each gateway antenna being operable to generate a gateway spot beam on a different predetermined selected terrestrial gateway region to enable one or more terrestrial gateway terminals within each of said terrestrial regions to receive and/or send data via the gateway spot beams, said predetermined selected terrestrial gateway regions being spatially separated from one another.

In embodiments, there is provided a satellite network for data communication, the network comprising a plurality of satellites arranged in medium Earth orbit (MEO) in a plurality of orbital planes such that a plurality of satellites are provided in each orbital plane, each satellite being operable to communicate with at least one terrestrial user terminal and comprising at least one communications antenna operable to generate a spot beam on a predetermined selected terrestrial region to enable said one or more terrestrial user terminals to receive and/or send data via the spot beam, wherein the satellites within an orbital plane are pseudo-randomly spaced.

In one embodiment, the plurality of satellites is provided in two or more orbital planes. In one embodiment, the plurality of satellites is provided in four or more orbital planes. In one embodiment, wherein 2 to 16 satellites are provided in the or each orbital plane. In one embodiment, 8 to 16 satellites are provided in the or each orbital plane. In one embodiment, 8 satellites are provided in the or each orbital plane.

In one embodiment, the plurality of satellites is arranged in an orbital configuration such that at least one satellite is always visible to a user terminal and available at any one time.

In one embodiment, the plurality of satellites is arranged in an orbital configuration such that the spot beams of at least two satellites are operable to cover the same terrestrial region. This provides increased capacity through spatial diversity.

In one embodiment, one or more communications antennas within the network are arranged to operate on the same frequency or band of frequencies. In one embodiment, the or each communications antenna on each satellite in the network is arranged to operate on the same frequency or band of frequencies.

In one embodiment, the or each satellite is arranged to operate in the $K_a$ band of frequencies. In one embodiment, each satellite comprises two or more communications antennas.

In one embodiment, for each satellite, each communications antenna is arranged to operate on the same frequency or band of frequencies. In one embodiment, each communications antenna on a given satellite is operable to target a different terrestrial region.

In one embodiment, the or each communications antenna on each satellite is operable to generate a spot beam on a selected terrestrial region having an angular width of 0.4 degrees In one embodiment, the or each communications antenna on each satellite is operable to generate a spot beam covering a region having a longest dimension of approximately 100 to 200 km in nadir.

In one embodiment, the or each communications antenna on each satellite is operable to generate a spot beam covering a region having a longest dimension of approximately 125 to 175 km in nadir.

In one embodiment, the or each communications antenna on each satellite is operable to generate a spot beam covering a region having a longest dimension of approximately 150 km in nadir.

In one embodiment, the or each beam has a substantially circular/elliptical cross-section with a diameter/minor axis of approximately 150 km.

In one embodiment, each of the plurality of satellites is arranged at an orbital altitude of between 17000-23000 km. In one embodiment, each of the plurality of satellites is arranged at an orbital altitude of between 19000-20000 km.

In an embodiment, there is provided a method for satellite communication, comprising: providing a plurality of communication satellites arranged in a medium Earth orbit (MEO) and in at least one orbital plane and operable to communicate with at least one terrestrial user terminal; and generating, using at least one communications antenna on at least one satellite, a spot beam on a selected terrestrial region to enable a user terminal in said selected terrestrial region to receive and/or send data via said spot beam, wherein the spot beam is operable to cover a region having a longest dimension of approximately 50 to 300 km in nadir.

In an embodiment, there is provided a method for satellite communication, comprising: providing a plurality of communication satellites arranged in a medium Earth orbit (MEO) and in at least one orbital plane and operable to communicate with at least one terrestrial user terminal; and generating, using at least one communications antenna on at least one satellite, a spot beam on a selected terrestrial region to enable a user terminal in said selected terrestrial region to receive and/or send data via said spot beam, wherein the spot beam has an angular width in the range of 0.2 to 2 degrees.

Embodiments of the present invention will now be described in detail with reference to the accompanying drawings, in which.

The present invention relates to a method satellite system that achieves high levels of spectrum efficiency to provide high-speed Internet services to remote users. The system uses a unique combination of user terminal and low-cost satellites to deliver an Internet service experience comparable to the fastest broadband offers currently available from wired terrestrial networks. It combines open loop pointing of high-gain user terminals with Medium Earth Orbit satellites that require low levels of station keeping fuel to maintain pointing of their communications beams to the selected service areas.

The present invention, in embodiments, relates to a satellite communication system and method that can concentrate high-speed broadband access to users within geographic cells of approximately 150 km diameter. The inventors of the present application have realised, for the first time, that MEO satellites, in combination with specific operational parameters, can have a number unique advantages compared to conventional satellite communication systems.

Figure 1:
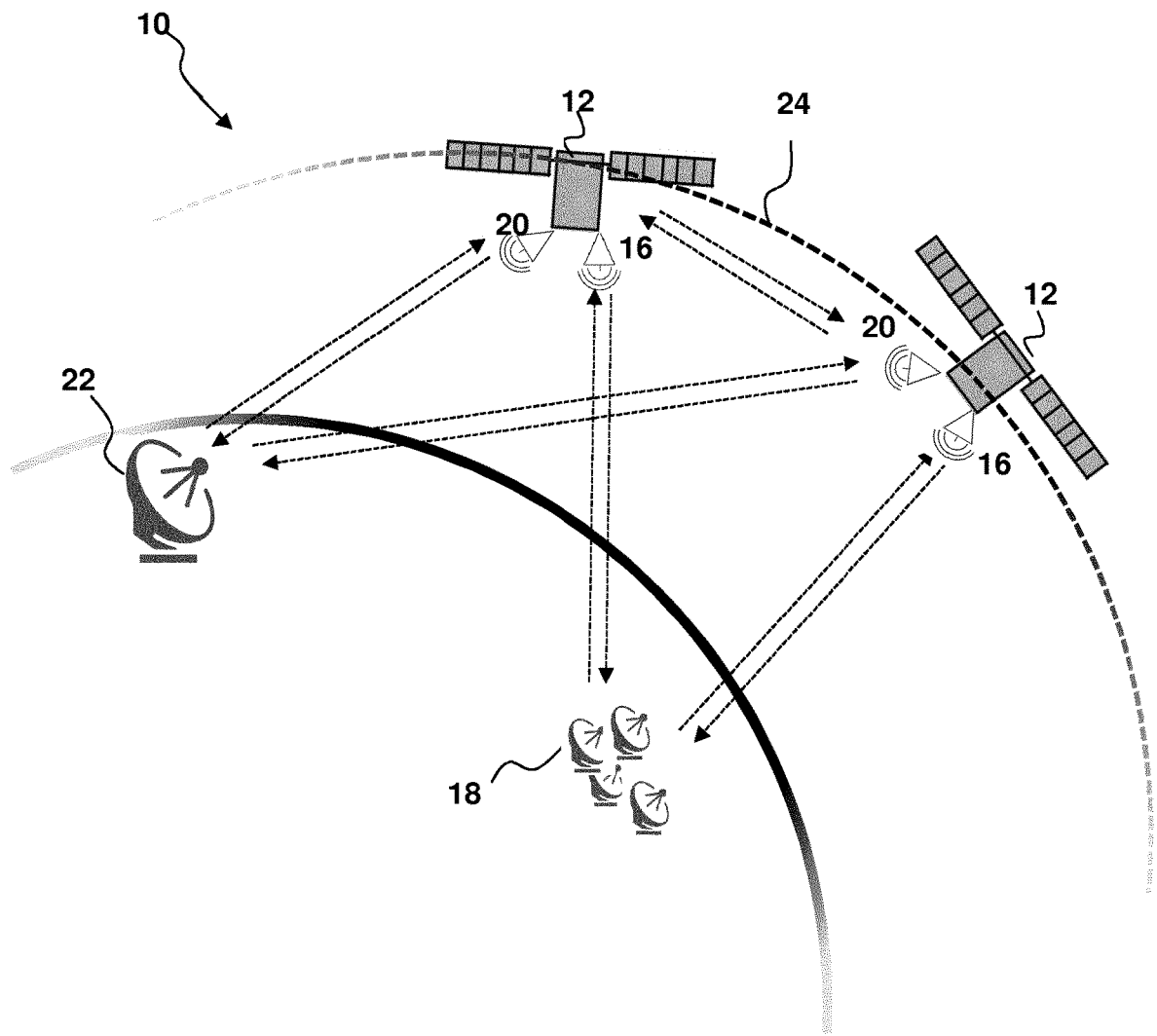
FIG. 1 is a schematic diagram of a satellite communication network according to an embodiment of the present invention.

FIG. 1 shows a general schematic overview diagram of a satellite communication system 10 according to an embodiment of the invention.

The system 10 comprises a plurality of data communication satellites 12 arranged in a medium earth orbit (MEO) 14 with, in this specific embodiment, an orbital altitude of approximately 19500 km. The satellites 12 are arranged in a constellation arrangement in different orbital planes as will be discussed below (only one orbital plane is shown in FIG. 1 for clarity). The satellites 12 each have one or more antennas 16 arranged to transmit data to and receive data from ground-based user terminals 18. Each user terminal 18 has an antenna as will be described later.

Further, each satellite 12 has one or more separate gateway antennas 20 arranged to communicate with one or more ground-based gateways 22. The gateway(s) 22 provide the user terminals 18 with access to the internet via the satellites 12. Whilst only a single gateway 22 and single gateway antenna 20 per satellite 12 is shown in FIG. 1, this is not to be taken as limiting as will be described below.

Satellite Orbital Configuration

The satellite orbital configuration of the present invention is selected to meet a number of demands. The orbital configuration is, in non-limiting embodiments, selected such that at least two satellites are visible at any one time for any user terminal 18 in the targeted region(s) of the Earth. This provides tolerance against operational system failures to maintain connectivity as well as providing advantages in terms of flexibility and capacity as will be described below. In addition, the orbital configuration is selected such that high gain tracking antennas are not needed for the user terminals, reducing cost and complexity.

Furthermore, the orbital arrangement is designed to optimise the size and number of satellites 12 that can be deployed by a single low-cost direct-injection launch vehicle (not shown).

The desired configuration is achieved, in non-limiting embodiments, by the provision of a plurality of satellites in at least four orbital planes, with a plurality of satellites 12 in each orbital plane.

Figure 2:
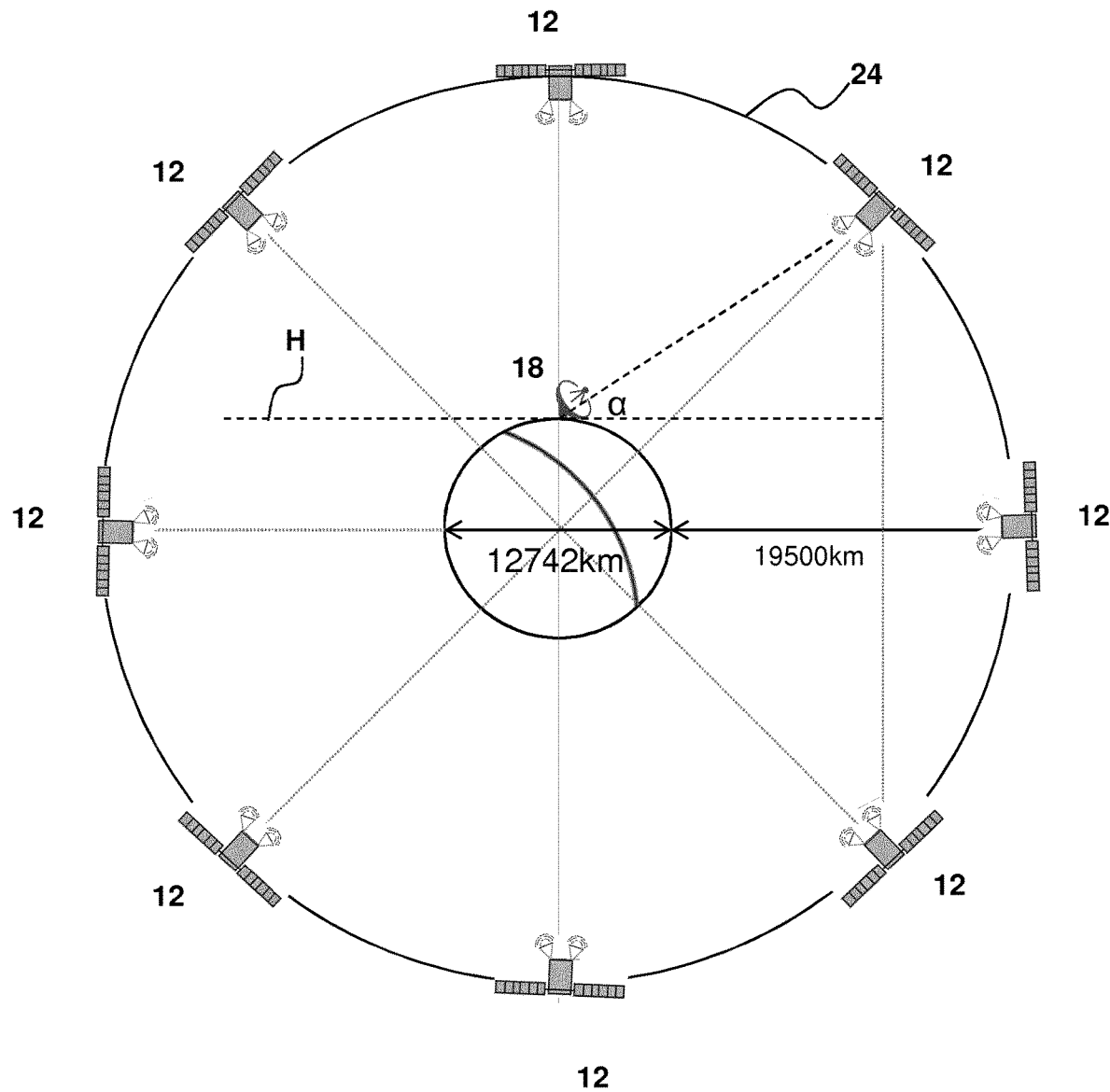
FIG. 2 is a schematic diagram showing a plurality of satellites in a single orbital plane and the interaction of the satellites with an exemplary user terminal.

FIG. 2 shows a schematic diagram of the position of satellites 12 in a single orbital plane 24. In this embodiment, eight satellites 12 are placed into an orbital plane 24 that is inclined to the equator. The satellites 12 are equally spaced apart in the orbital plane 24 which is inclined at 60 degrees to the equator of the Earth. In other words, the angular separation between each satellite 12 in a given orbital plane 24 is 45 degrees. In non-limiting embodiments, all of the satellites 12 in one plane 24 may be deployed by a single launch vehicle.

In FIG. 2, the eight satellites 12 in one plane 24 are shown, relative to a user terminal 18, as viewed along an axis orthogonal to the plane 24. As shown, depending on the user view of the sky from the user terminal 18, the configuration enables at least two satellites in the same plane to be available to the user terminal 18.

Figure 3:
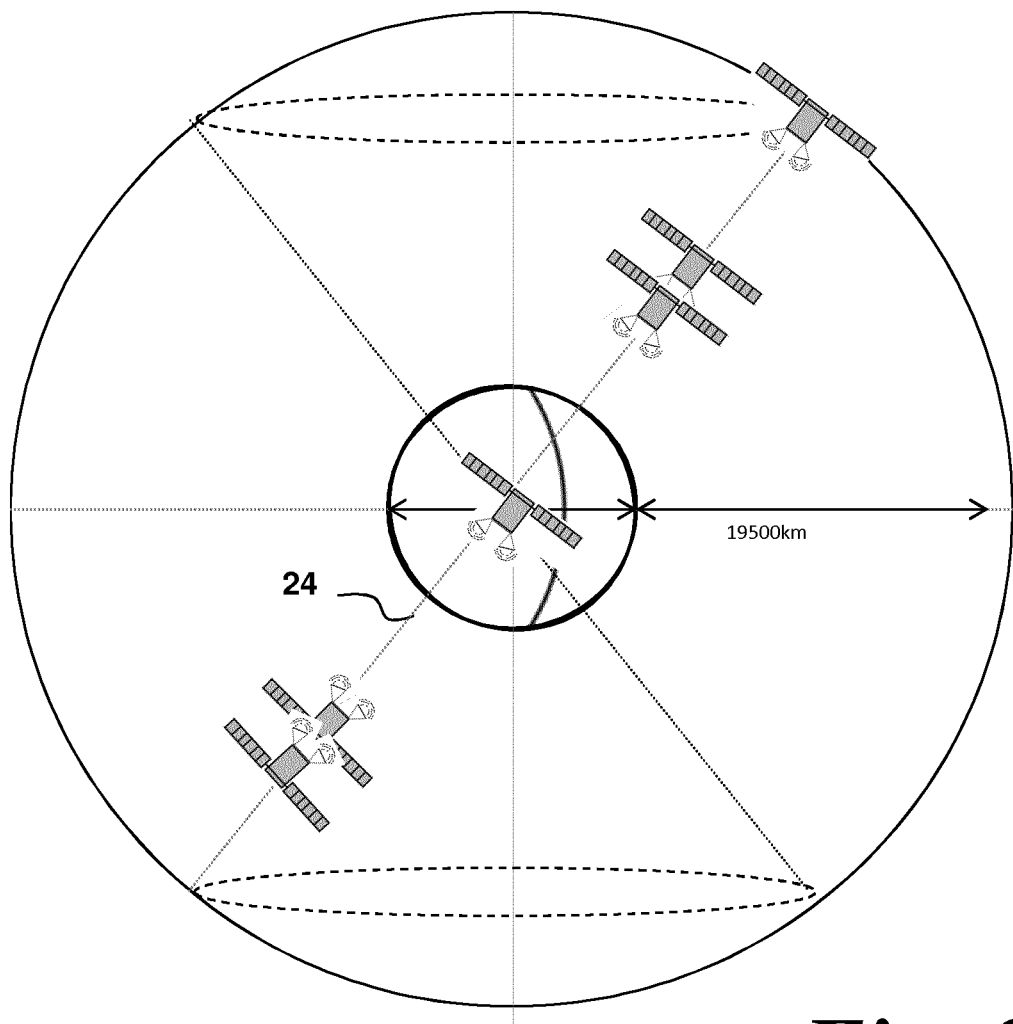
FIG. 3 is a schematic diagram similar to FIG. 2 but showing the orientation of the orbital plane of satellites of FIG. 2 relative to the Earth's polar axis.

FIG. 3 shows the same orbital plane 24 comprising eight satellites 12 but shown relative to the Earth's equator. As shown, it therefore requires a minimum of four planes of satellites 12 to provide global coverage.

Figure 4:
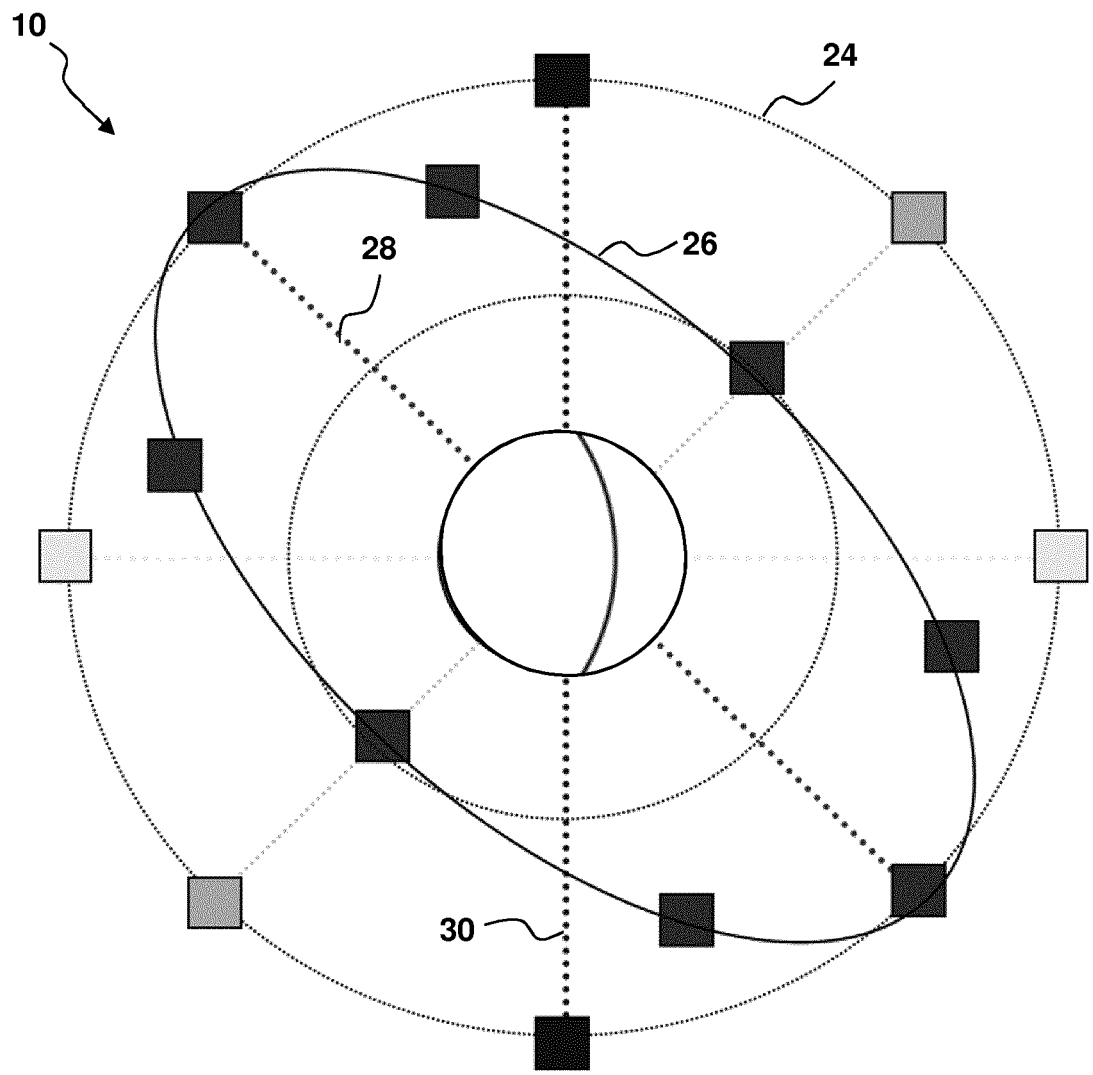
FIG. 4 is a schematic diagram showing four orbital planes each containing eight satellites according to an embodiment of the present invention.

FIG. 4 shows the four orbital planes 24, 26, 28, 30 according to an embodiment. As shown, the planes 24, 26, 28, 30 are set 45 degrees apart around the Earth's polar axis. For clarity, the satellites 12 are represented as squares and only one plane 18 shows all eight satellites 12 in that plane 18.

By using the four orbital planes 24, 26, 28, 30 which are equally spaced about the polar axis (and contain a total of 32 satellites in this embodiment), service coverage can be provided anywhere on the Earth. Further, this configuration enables the use of the minimum number of satellites to give such global coverage. In contrast, geosynchronous satellites are unable to provide a service at the Earth's poles. Other non-geosynchronous orbits (NGSO), such as low earth orbit (LEO), require a larger number of satellites to achieve global coverage.

As shown, the disposition of the orbital planes 24, 26, 28, 30 is not static relative to a fixed location user terminal 18. The satellites 12 in the MEO have an orbital period of approximately 11.5 hours. Whilst the satellite orbital arrangement is effectively fixed in space (in other words, it does not process every 24 hours), due to the Earth's rotation different planes of satellites come cyclically into view.

Therefore, the configuration can supply a predefined user service area in a particular region of the Earth with continuous coverage from at least two satellites in the constellation. However, access to the coverage through the satellites is not geometrically fixed, and the satellites providing the coverage will change regularly (typically every 4 to 6 hours).

Figure 5:
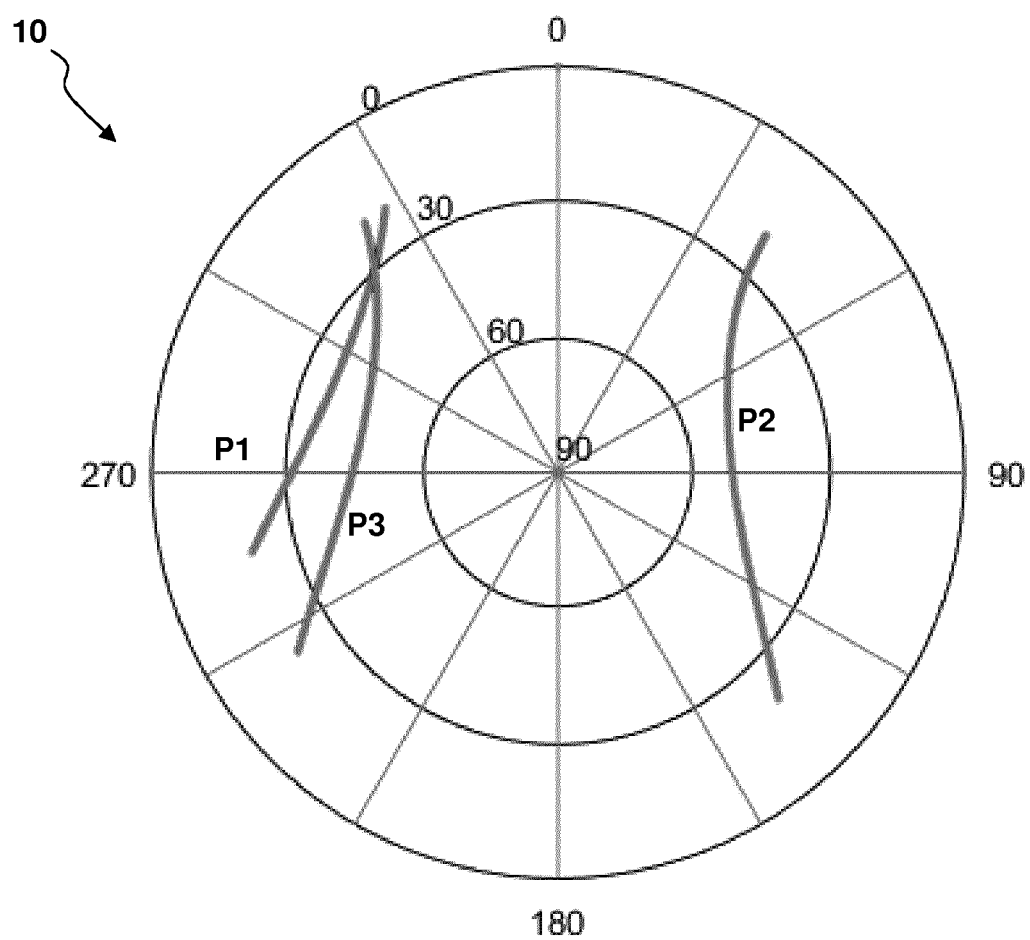
FIG. 5 is a schematic diagram showing the track of any one satellite 12 across the sky as a function of orbits.

FIG. 5 shows an example of this. From the user terminal 18 frame of reference, the satellites 12 used to provide the service will always be greater than or equal to 20 degrees above the horizon.

The track of any one satellite 12 across the sky will vary. Some will rise from the horizon and pass directly overhead and set on the opposite horizon. Some will rise and set within a smaller segment of the horizon and will only achieve modest elevation angles.

FIG. 5 shows an azimuth/elevation plot for a single satellite 12 in orbital plane 24 for a 30 hour period for a user in a specific region of the UK. The spokes represent azimuth, and the concentric circles represent elevation.

The track P1 is the first pass of the satellite 12, where acquisition of signal (AOS)=T0+93 mins, loss of signal (LOS)=T0+243 mins and the visible duration is 150 mins.

P2 is the second pass of the satellite 12, where AOS=T0+642 mins, the LOS=T0+842 mins and the visible duration is 200 mins.

P3 is the third pass of the satellite 12, where AOS=T0+1461 mins, the LOS=T0+1844 mins, and the visible duration is 183 mins.

As described above, in a non-limiting embodiment, the satellites 12 orbit at an altitude of approximately 19500 km. However, the skilled person would understand that this is non-limiting and a range of different orbital altitudes may be used with the present invention if required. For example, any suitable orbital altitude above Low Earth orbit (typically up to an altitude of 2,000 km) and below GEO (typically 35-36000 km) may be used.

Suitable satellite orbital altitudes falling within the scope of the present invention may be greater than 2000 km (which would provide an orbital period of approximately 2 hours) up to about 30000 km (which would provide an orbital period of approximately 19 hours).

The preferred altitude or range of altitudes is a trade-off between orbital period (which will influence the time spent over the transmission region and the angular rate at which the transmitters and receivers need to be tracked) and the increased signal strength required to transmit at greater distances). The inventors of the present application have found that a range of 17000-23000 km (corresponding to an orbital period in the range of approximately 10 to 14 hours) offers a suitable compromise between these competing interests, notwithstanding the need to avoid the altitude used by GPS satellites, which is 20200 km.

In addition, whilst the most common, and useful, orbits are circular, elliptical orbits may be used in particular circumstances. In general, any elliptical orbit used with the present invention would require an MEO spacing at least at apogee, for example, within the ranges discussed above.

Another benefit of the MEO operation of the satellites 12 is that the latency period for data communication is about half that of GEO satellites. This enables the system according to an embodiment of the present invention to accommodate high-speed interactive services. Furthermore, the slow rate of apparent satellite progression across the sky (relative to a user terminal 18) simplifies the antenna configuration required by the user terminal 18 (which will be described later) in the way in which the motorised high-gain (highly directive) antenna of a user terminal follows a particular satellite 12.

Satellite Configuration

Figure 6:
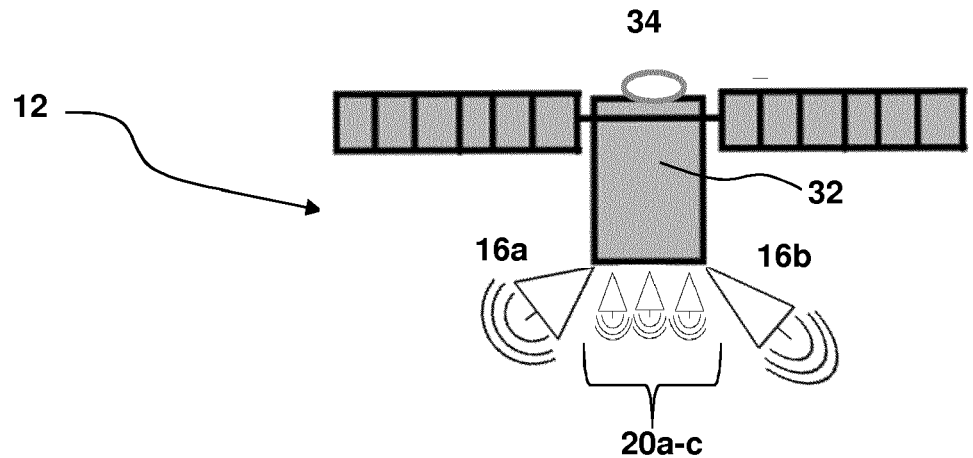
FIG. 6 is a schematic diagram showing the configuration of a typical satellite in the constellation of the network.

A general schematic of a typical satellite 12 according to an embodiment is shown in FIG. 6.

The satellite 12 has a body 32 which comprises at least two high gain communication antennas 16*a*, 16*b* operable to communicate with the user terminals 18 as will be described below. The antennas 16*a*, 16*b* produce two independently directable spot beams as will be described below.

Further, in embodiments, the satellite 12 has three or more gateway antennas 20*a-c*. These antennas 20*a-c* are controllable and directional and can be targeted at up to three separate gateways 22 that may be located in separate geographic regions as required.

In embodiments, the antennas 16*a*, 16*b*, 20*a-c* are adjustable through direction mechanisms (not shown). In embodiments, adjustment of the antenna 16*a*, 16*b*, 20*a-c* orientations relative to the body 32 of the satellite 12 are limited to around 2.5 degrees of movement in two orthogonal planes. However, other ranges and configurations may be used.

Further, a star tracker 34 is provided to enable satellite orientation in use as described below.

However, the above description is not to be taken as limiting and other components may form part of a satellite 12 within the constellation. For example, the use of two antennas 16*a*, 16*b* which produce two independently directable beams per satellite 12 in this described embodiment is not to be taken as limiting. For certain applications, it may be preferable to provide smaller and lighter satellites having only a single transmission antenna 16. This may reduce launch and operation costs and may, for example, permit larger numbers of satellites to be used within a particular orbital plane or on in greater numbers of orbital planes for a given investment.

In the alternative, a multiplicity of high gain communication antennas 16 may be provided per satellite which are operable to generate a multiplicity of independently directable beams may be provided. In other words, each satellite 12 may have more than two high gain antennas for broadcast communication with user terminals 18 in more than two geographic regions. For example, each satellite may have up to eight high gain antennas. This may be suitable for a satellite which is typically in the 12 kW class.

In embodiments, the gateway(s) 22 are in a different location to the service users, and so at least two antennas arranged in different directions may be required. The satellite gateway antennas 20*a-c* may be configured as required. For example, and unique to the present invention, the gateway antennas 20*a-c* may use a relatively narrow beam similar to the user beams as will be described below.

Further, different configurations of satellites could be used within a constellation according to the present invention. For example, within a single orbital plane smaller satellites could be used together with larger satellites having a larger number of antennas, or different size satellites could be used within different orbital planes.

Satellite User Spot Beams

In accordance with the embodiment described above, each satellite 12 has two communication antennas 16*a*, 16*b* which generate two user spot beams 36, 38 that may be steered to illuminate different geographic areas. In an embodiment, the illuminated area is approximately 150 km in diameter in nadir. The precise size of the illuminated area may vary. However, it is intended that the beam cross-section has a longest dimension in the general range of 50-300 km in nadir (i.e. width and/or length, both of which may correspond to diameter if the beam cross section is circular).

The beams may have any specific cross-section which will, of course, depend on the radiating antenna of the satellite 12. However, circular (at nadir) or elliptical (depending on the elevation of the satellite as perceived by the user) is the usual cross-section generated by a typical antenna.

Figure 7:
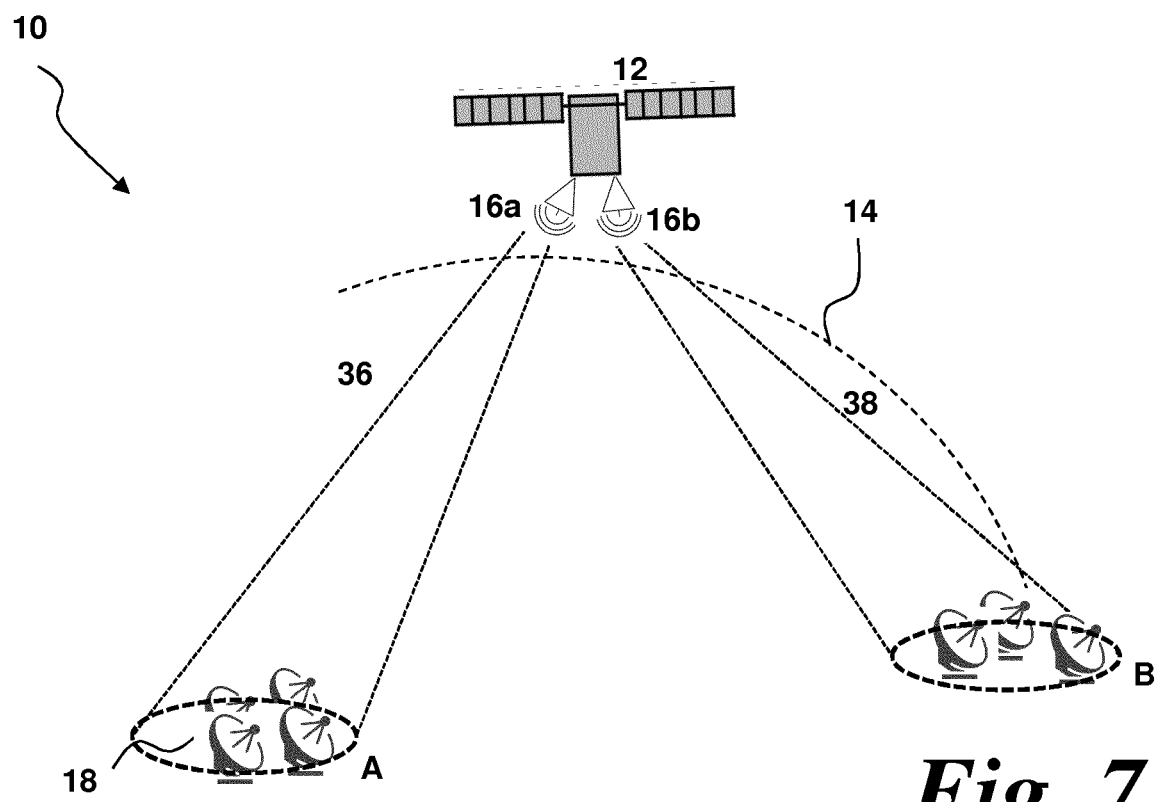
FIG. 7 is a schematic diagram showing a single satellite illuminating two different terrestrial regions with two spot beams.

A general schematic is shown in FIG. 7. FIG. 7 shows a single satellite 12-1 which is operable to serve two separate user regions A and B. The scale and size of the spot beams 36, 38 are not to scale and are heavily exaggerated for effect and clarity.

In embodiments, to generate a spot size of 150 km from the specified MEO altitude of approximately 19500 km, each beam would require a beamwidth of 0.4 degrees.

As shown, two spot beams 36, 38 are generated by communication antennas 16*a*, 16*b* respectively on each satellite 12. Providing two communication antennas 16*a*, 16*b* per satellite has been found by the inventors to be an efficient trade-off between the complexity and size (e.g. the number of antennas and associated telecommunication equipment required) for each satellite 12 and the useful coverage area for each satellite 12. However, as discussed above, this is non-limiting and other configurations could be used with the present invention.

As shown in FIG. 7, in one non-limiting embodiment, each satellite 12 may serve two spatially-separate user regions A and B, where A and B are geographically located such that they can be served simultaneously by any one single satellite 12 which is visible over the horizon H of user terminal(s) 18 visible in the specified geographic regions A and B.

Figure 8:
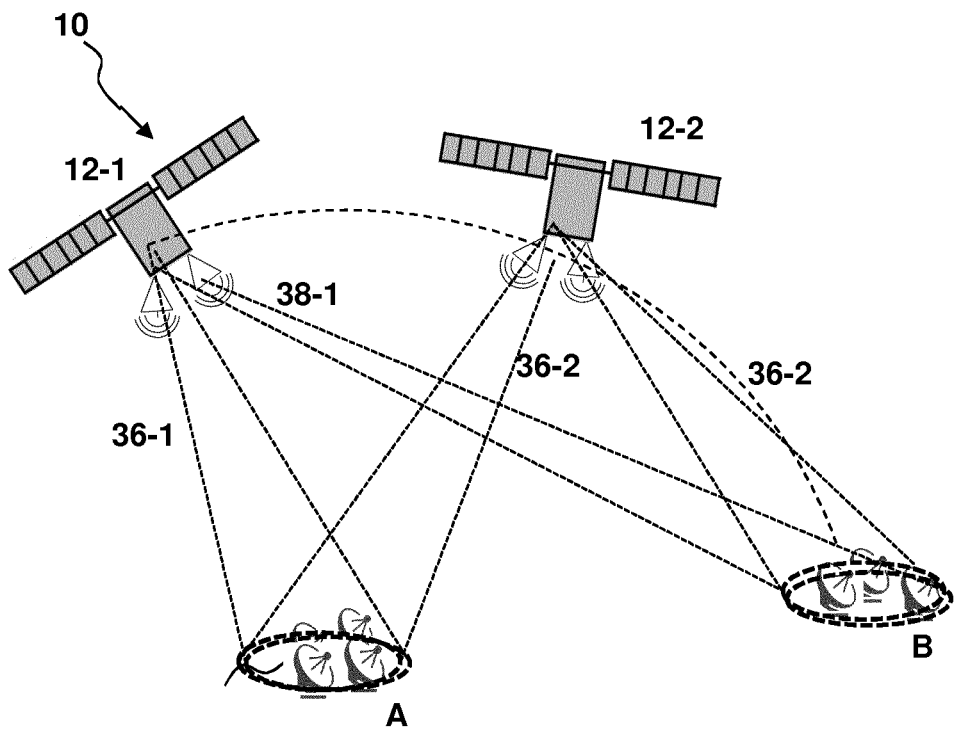
FIG. 8 is a schematic diagram showing two satellites illuminating two different terrestrial regions with a total of four spot beams.

Ideally, the regions A and B should be located sufficiently close to enable the maximum amount of simultaneous visibility of the satellite 12 along its orbital path, but not so close as to cause interference between transmissions and/or antennas on the satellite 12. In addition, whilst the schematic of FIG. 7 shows only a single satellite 12 in a single orbital path 14, in practice multiple satellites 12 on multiple orbital planes 24, 26, 28, 30 are used (as shown in FIG. 8) and the geographic regions must be selected to enable effective use of the available antennas and corresponding bandwidth.

In practice, a typical separation of regions A and B would be approximately two spot diameters. Therefore, in this embodiment with a spot diameter of 150 km in nadir, the separation would be of the order of 300 km between edges of regions A and B or 450 km (i.e. three spot diameters or longest dimensions) between the centres of the respective spot beams.

However, whilst the above configuration has practical utility, a significant advantage of the present invention is the ability to utilise multiple satellites to cover one or more geographical regions as discussed below.

Satellite Beam Configuration and Data Transmission

The use of highly directive, narrow beams in combination with MEO satellite operation has significant advantages over known arrangements.

For example, the high directivity of the satellite beams and, consequently, user terminal antennas (about 0.4 degrees in the described embodiment) enables the system 10, in embodiments, to share a section of $K_a$-band frequencies that may already be allocated to GEO satellites. The $K_a$-band is, as is well known, a portion of the electromagnetic spectrum in the microwave region and defined as frequencies in the range 26.5 to 40 GHz.

In use, the antennas may be carrying both forward and return traffic (to and from the satellite). In embodiments, data is transmitted between the satellite(s) 12 and the user terminal(s) 18 within 2.5 GHz of the $K_a$-band spectrum.

In embodiments, the RF link to the user terminals 18 is capable of encoding 2 bits/Hz and both vertical and horizontal polarisations may be employed. In exemplary embodiments, this yields a maximum continuous data throughput per satellite beam 36, 38 of about 10 Gbp/s. This is sufficient to carry, for example, around 1000 separate High Definition (HD) video streams simultaneously.

Multiple Beam Capacity

A significant advantage of the present invention is to enable coverage of single geographical region with multiple satellites to provide fail-safe and/or enhanced service to a particular selected geographical region.

Through the use of MEO satellites with narrow spot beams, any satellite that is "visible" (i.e. within the field of view of) a user terminal 18 in a selected area may illuminate that selected geographic area. Unlike GEO, which can occupy only one orbital plane, the system 10 can operate with multiple orbital planes, each comprising eight satellites 12 in orbit.

This has the advantage of permitting high capacity or rapid service growth within a specific geographic area, since an additional illumination plane can add multiples of satellite (in this embodiment, around 10 Gbps per satellite) capacity, without recourse to additional RF spectrum. In contrast, GEO systems are limited in terms of absolute capacity that can be provided as the satellites can only occupy one orbital plane.

The use of narrow spot beams has the technical advantage that multiple beams from different satellites may illuminate the same user area. This is because, due to the narrow beamwidth of each beam, each beam can be separately angularly resolved by each user terminal 18 and, therefore, interference between beams 36, 38 is mitigated.

This advantage permits all spot beams 36, 38 on all satellites to use the same RF spectrum allocation, as will be described later. Therefore, each spot beam 36, 38 can use the maximum available frequency spectrum, and the total number of beams which can be provided to a given area is limited only by the angular resolution of the antennas of the user terminals 18 (described later).

Therefore, a single MEO satellite 12-1 in a single plane may direct the full satellite bandwidth (in this embodiment, about 10 Gbps) into a single beam and a single terrestrial telecommunications operator may use this capacity.

If more capacity is required then the same terrestrial operator may use additional user terminal antennas to receive another 10 GBps from another satellite 12-2 in a neighbouring orbital plane.

Figure 9:
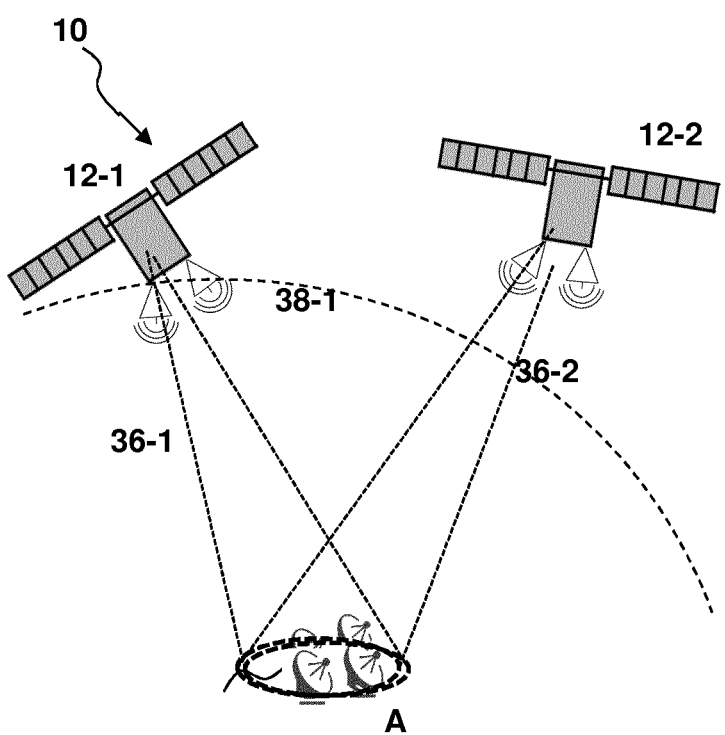
FIG. 9 is a schematic diagram similar to FIG. 8 but showing two satellites illuminating only a single terrestrial region.

This is illustrated schematically in FIGS. 8 and 9. FIG. 8 shows a general schematic, again not to scale, of two satellites 12-1, 12-2 each having spot beams 36-1, 36-2, 38-1, 38-2 illuminating two geographic areas A and B. FIG. 9 shows the same schema, but with each satellite 12-1, 12-2 only illuminating a single geographic area A, and so each satellite 12-1, 12-2 is able to deliver the full satellite bandwidth of about 10 Gbps to the single geographical area A.

Indeed, in an embodiment, the system is optimised for a relatively small number of high bandwidth users within the geographical region defined by a single beam area to facilitate rapid deployment of terrestrial mobile implementations for Internet connectivity (3, 4 and 5G, for example). This technology can be quickly deployed in remote or poorly served regions.

By providing two or more satellites 12-1, 12-2 operable to illuminate a single area as shown in FIG. 9, a telecommunications operator may be able to distribute multiple but interconnected (e.g. by microwave link) user antennas across the geographical region A covered by the beam illumination area.

This arrangement is operable to solve a number of known problems. For example, this arrangement would solve issues of localised signal loss due to rain fade, or temporary signal blockage by a LEO satellite that has priority use of the same frequency.

In addition, this arrangement yields a robust data connection because multiple satellites 12-1, 12-2 in separate orbital planes may contribute to the data stream. As well as boosting the maximum capacity, the loss of one satellite connection does not result in the temporary total loss of the service as is the case with known arrangements.

Figure 10:
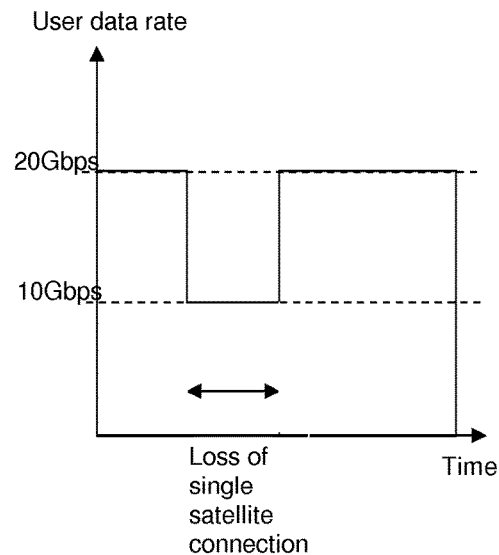
FIG. 10 is a graph showing data rate as a function of the number of illuminating satellites.

This redundancy is shown in FIG. 10. FIG. 10 shows the data rate experienced by a user as a function of time. FIG. 10 illustrates a configuration such as shown in FIG. 9 where two satellites 12-1, 12-2 are each providing their full capacity to a single geographic area (e.g. area A shown in FIG. 9).

At a particular time, connection to one satellite 12-1, 12-2 is lost. This may be through failure, line of sight blockage, the satellite 12-1, 12-2 passing through the GEO arc (described later in the "spectrum sharing" section) or for any other operational reason. At this point, the connection speed is temporarily halved to 10 Gbps.

However, in contrast with known arrangements, rather than experience an outage or outright failure of the service, the users only experience a temporary slowdown in their connection speed, which is later restored. Clearly, if more than two satellites 12-1, 12-2 illuminate a specific region, then the temporary loss of one satellite connection will result in a smaller temporary loss of capacity.

In embodiments, this angular resolution may be in the region of 3 to 5 degrees, with a preferred angular resolution of about 3 degrees. The inventors have found that this configuration is particularly advantageous for NGSO systems and permits significant scalability of capacity.

Of course, angular resolution is dependent on the size of the satellite dish and the operating frequency. A typical satellite TV dish is the smallest that it can be whilst being able to receive a good signal from a satellite in Ku band. It is elliptical because there is no need to resolve elevation as well as GEO arc separations. The width of such a dish is about 50 cm, giving a half power beamwidth of about 3 degrees.

In areas with lower signal strength, i.e. further north, a larger dish will be needed. This also happens to have a narrower beamwidth. Also a particular dish will have narrower beamwidth as the operating frequency increases, say from Ku to Ka band. At 20 GHz in Ka-band, a 30 cm dish will have about 3 degrees half power beamwidth. In the GEO arc adjacent satellites may be separated by as little as 0.1 degrees and operate on different frequencies to permit the use of minimalist user dishes.

Spectrum Sharing

By using satellite communication frequencies shared by GEO and LEO satellites, there is the risk of interference. However, in non-limiting embodiments, any potential interference with GEO satellites is avoided by switching off transmissions as the satellites 12 cross the GEO plane. Whilst this may result in temporary outage for the conflicted satellite, by providing at least two satellites 12 in any one plane which are always able to illuminate a particular geographic area, a continuous user service can be maintained as a given satellite crosses the GEO arc and has to cease transmission.

In addition, whilst the present invention may be authorised to utilise 2.5 GHz of the Ka-band spectrum for the MEO constellation of the present invention, this same 2.5 GHz may also be used by proposed LEO satellites. Any LEO satellite systems which utilise the same 2.5 GHz of spectrum may present a potential conflict. Thus, the present invention cannot interfere with the existing GEO users and will not interfere with the potential LEO systems, should they be deployed.

In practice this means that when a satellite 12-1, 12-2 crosses the GEO arc and the users of a GEO satellite would "see" the satellite in their receive beams, then the satellite 12-1, 12-2 must cease transmission until it is clear of such user receive beams. The same action is required for the brief period that users of a LEO satellite may "see" the transmission from a satellite 12-1, 12-2.

In addition, as described above, the baseline system 10 employs at least four orbital planes of four satellites each to guarantee service in the event of failures. If a satellite 12 crosses the GEO arc at an inclination of 60 degrees, this may result in a potential outage period of a few minutes. To minimise the potential outage the user terminal may be redirected to an alternative satellite 12 or, to avoid any outage, the user may employ two terminals or a single terminal with two separate antennas to ensure continuity of service.

Gateway Beam Design and Management

As described above, the gateway antennas 20a-20c can be designed to be functionally and structurally similar to the user antennas 16a, 16b in that they are designed to provide a narrow beamwidth to a specific geographical region.

A significant advantage of the narrow beamwidth of both receiving/transmitting antennas of the user terminals 18 and the gateway antennas 20a-20c is that it permits the same RF spectrum to be used for gateway transmission (from antennas 20a-c) and for user data communication (i.e. from antennas 16a, 16b). This has further benefits in terms of spectrum usage and maximum capacity because the entirety of a particular spectrum allocation for the satellite constellation can be used by each beam without the need to manage frequency spectrum usage to avoid interference. In other words, spatial diversity is improved. Provided that the antennas have a narrow beamwidth relative to the system geometry, then the antennas are able to resolve separate signal sources that can operate on the same frequency. The NGSO orbit planes can make use of the whole sphere, except for the GEO plane, which is already occupied. In embodiments, utilising low cost antennas with a 3 degree beamwidth still yields a large capacity increase compared to GEO.

The present invention utilises spatial diversity to reuse the same allocation of RF bandwidth for all the satellites 12-1, 12-2 in the constellation 10. The user terminals 18 may all operate with the same allocation of RF bandwidth but point, via highly directional antennas, to different satellites 12-1, 12-2 as required.

Figure 11A:
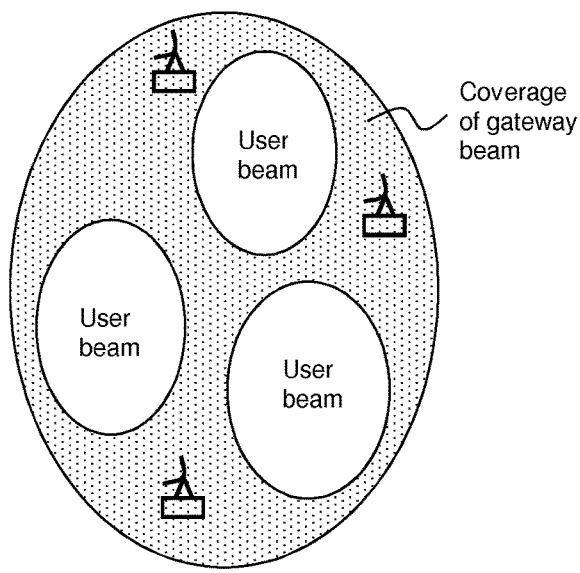
FIG. 11a is a prior art schematic of a known gateway system.
Figure 11B:
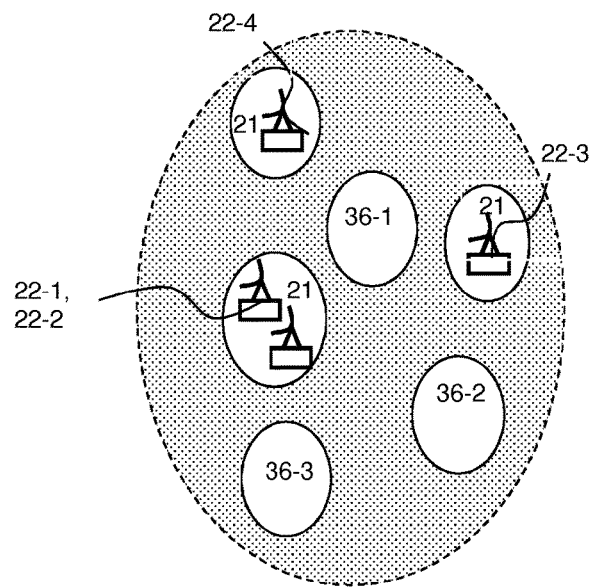
FIG. 11b illustrates the gateway beam system of an embodiment of the present invention.

FIGS. 11a and 11b illustrate the difference between a known gateway configuration (FIG. 11a) and the configuration of the present invention (FIG. 11b).

Turning first to FIG. 11a, it is a common requirement that particular network operators may want their own gateway antennas (shown by the antenna symbols in FIG. 11a) and that these may be distributed over a wide geographic beam. The user beams are located within the area of the gateway beam and, as shown, the area covered by the user beams is much smaller than that of the gateway beam.

The satellite gateway antenna therefore has a broad beamwidth to be able to illuminate the distributed gateway operators and, as a result, the gateway connection cannot share the same frequency band as the users.

FIG. 11a shows three gateways within the coverage area of a broad gateway beam. All three gateways will use different frequencies within the beam to avoid conflicts. However, this arrangement can lead to a data "bottleneck", because of the scarcity of available transmission spectrum and the need to share it between several gateways.

Further, the gateway antennas must transmit and receive between the gateways on different frequencies from the user beams and so spectrum sharing is not possible in this configuration. Thus, bottlenecks and inefficient spectrum usage result.

The present invention overcomes these issues. A schematic of the present invention is shown in FIG. 11b. In the present invention, the same RF bandwidth allocation is used for both the user beams and the gateway beams. In other words, instead of attempting to communicate with the gateways 22 via a wide area or geographic beam, each gateway 22 is given its own beam 21.

This is illustrated in FIG. 11b. As shown, three user beams 36-1, 36-2, 36-3 are provided, together with three gateway beams 21. Each gateway beam illuminates a geographical region containing one or more gateways 22-1, 22-2, 22-3, 22-4 as shown.

As shown for gateways 22-1 and 22-2, more than one gateway terminal 22 may be located within a gateway beam 21 for redundancy. Both gateways 22-1, 22-2 use the same data and are merely provided for redundancy purposes. However, this is not possible with conventional arrangements.

In the present invention, no additional spectrum is required to avoid bandwidth bottlenecks. However, angular separations between individual gateway beams 21 have to be managed in the same way as for the user beams 36, 38.

Figure 12:
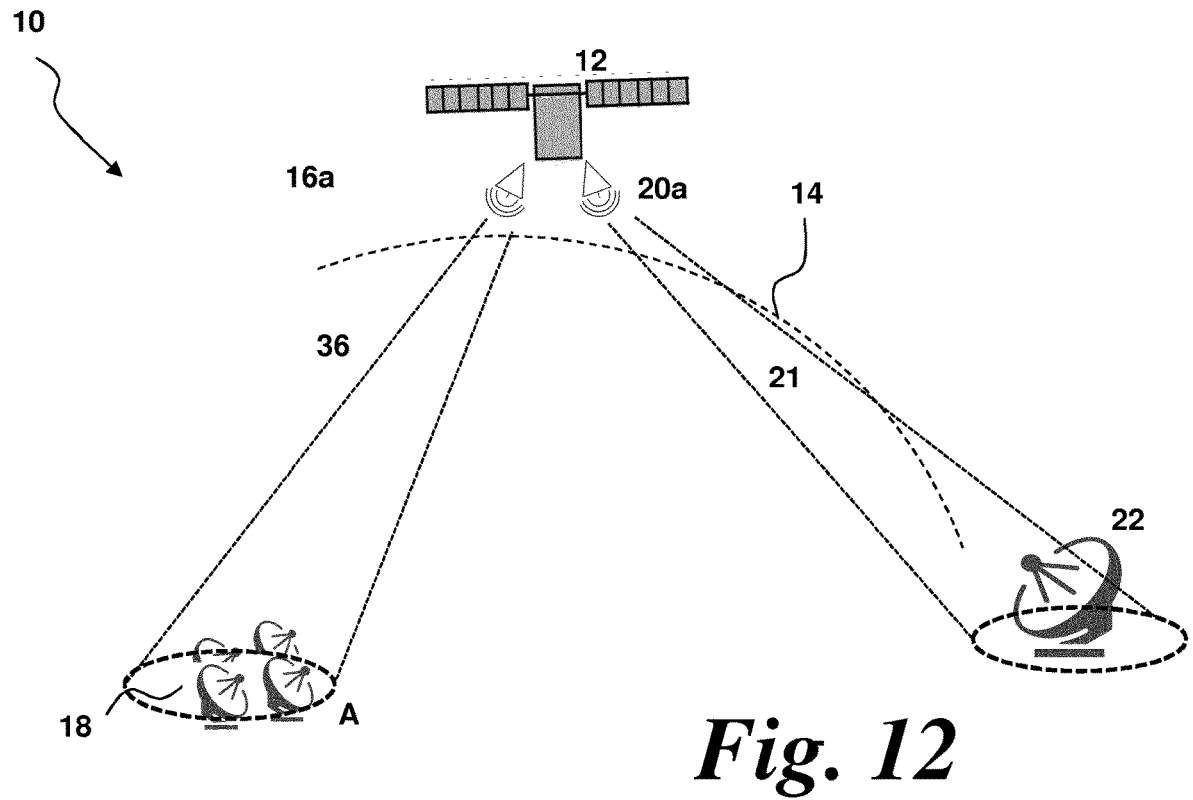
FIG. 12 is a schematic diagram similar to FIG. 7 but showing a gateway beam and a user beam.

FIG. 12 is a schematic view (not to scale) showing the gateway configuration in the manner of FIGS. 7, 8 and 9. As shown, a user beam 36 illuminates a user area A, and a gateway beam 21 illuminates a gateway 22.

For both the user beams 36 and gateway beams 21, the illuminated area is approximately 150 km in diameter in nadir. The precise size of the illuminated area for the gateway beam may vary. However, in common with the user beams it is intended that the beam cross-section has a longest dimension in the general range of 50-300 km in nadir (i.e. width and/or length, both of which may correspond to diameter if the beam cross section is circular). This advantageously allows use of the same antenna configurations for the gateway antenna 20a, b, c as for the user antenna 16a, 16b on the satellite 12.

In embodiments, as for the user beams, to generate a spot size of 150 km from the specified MEO altitude of approximately 19500 km, each gateway beam would require a beamwidth of 0.4 degrees.

Figure 13:
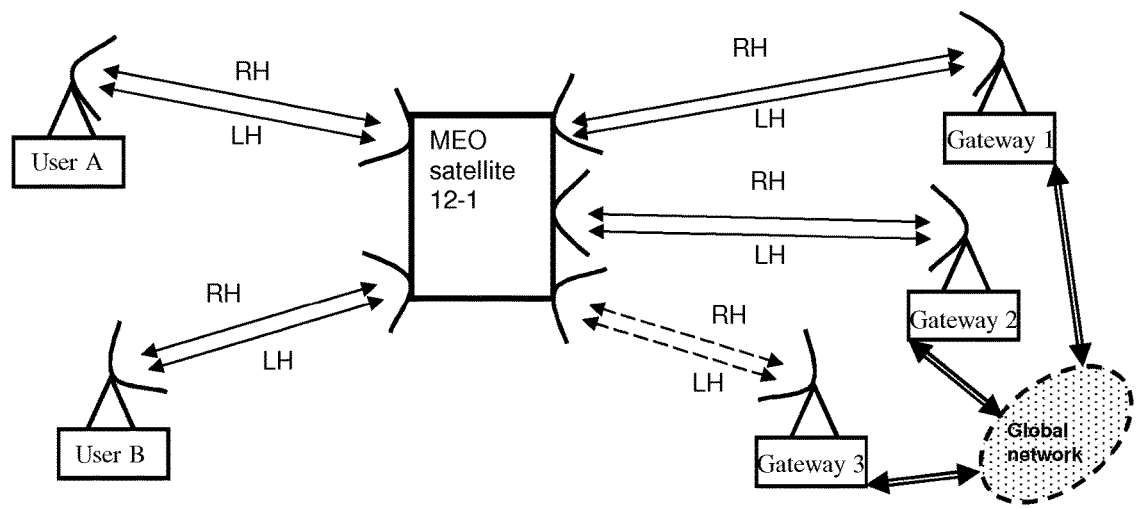
FIG. 13 is a schematic of the communication within the network between users, gateways and satellites.

As described above, each of the satellites 12 can generate two user beams 36, 38. Each satellite 12 can also generate three separate gateway beams 21a-21c. Furthermore, each beam 36, 38, 21 carries data in two polarisations (Left-Hand and Right-Hand circular), which increases the capacity. This is shown in FIG. 13.

In the present invention, the connectivity between users and a global network (including the internet for example) is designed to be single failure tolerant. As described above, this is achieved by maintaining two or more satellites in constant view of any given user terminal within a specified geographic region and by maintaining at least two out of three gateway connections active at any one time.

Figure 14:
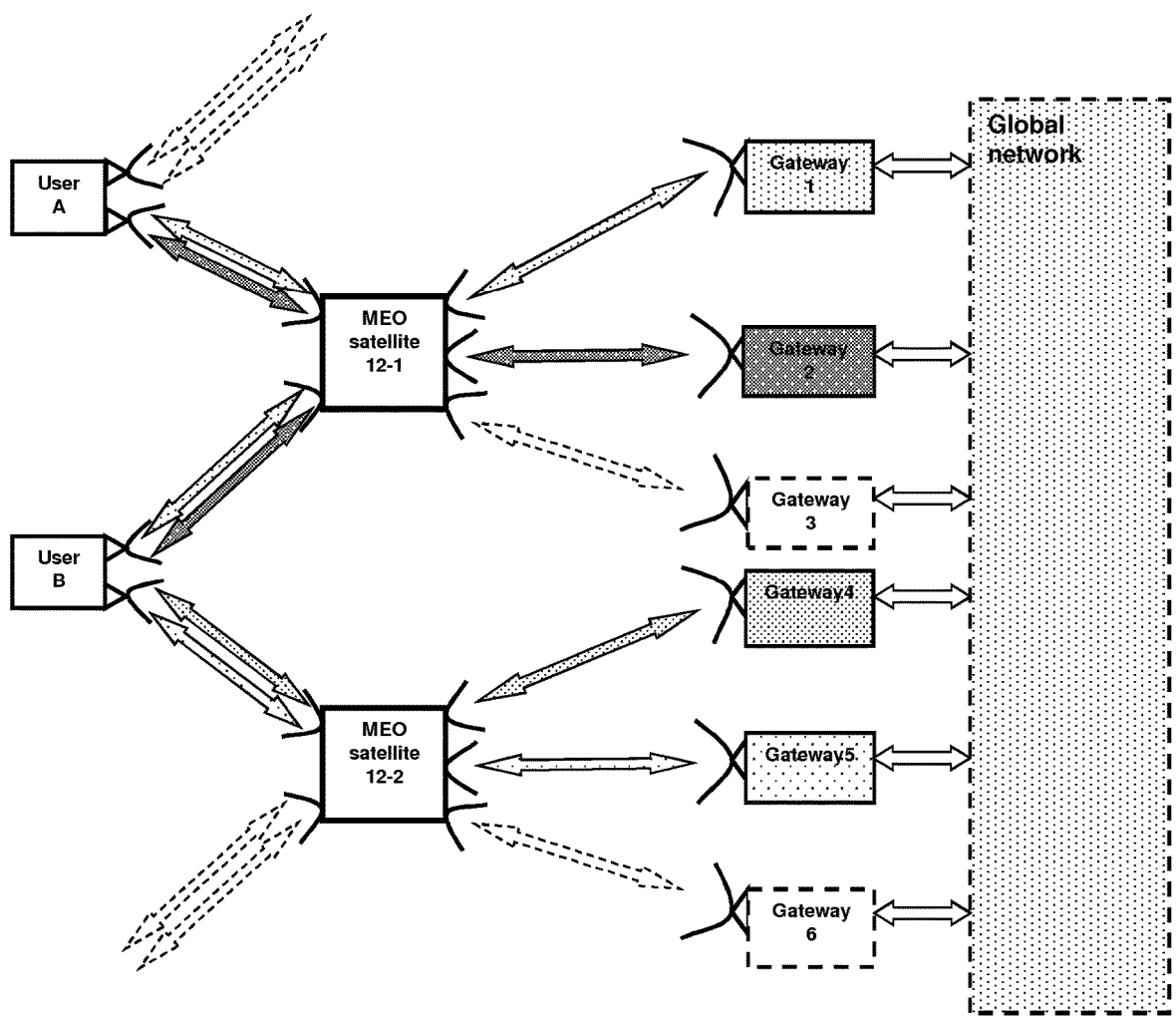
FIG. 14 is a further schematic showing communication within the network.

FIG. 14 shows the shared signal pathways which are colour-coded. Connections currently in use are shown in solid arrows, and connections on standby are shown in dashed arrows.

The use of LH and RH polarisations facilitates the movement of any one user connection between gateways 22 and between satellites 12, as required to maintain a constant connection. The connections may be moved one polarisation at a time to ensure constant connectivity.

At each changeover in a signal pathway the connection capacity would be reduced temporarily, but not lost, as described above with reference to FIG. 10.

Satellite Beam Control

Utilisation of such a narrow beamwidth requires precise controlling of the antennas 16a, 16b (and, concomitantly, spot beams 36, 38) by each satellite 12. In embodiments, the antennas 16a, 16b are controlled to direct the spot beams 36, 38 to a specific target geographical region or regions. Additionally, the user terminals 18 are controlled to follow a currently-visible satellite 12.

Closed-loop RF tracking antennas are known in the art. Such antennas lock on to a ground-based RF beacon centred in the geographic user area. However, such arrangements are complex and costly.

In embodiments, beam control in the present invention is achieved by continuous adjustment of the satellite orientation and the satellite antennas 16a, 16b in order to provide a means of beam direction and control.

In embodiments, the star tracker system 34 is used for attitude control. The star tracker 34 enables the satellite 12 to create a geometric model of its orientation with respect to the Earth at any point in its orbit. This model enables the body of the satellite to be pointed at a selected area on the Earth's surface.

Typically, the antennas 16a, 16b may be fixed to one face of the satellite body 32 (such as the top floor) and this face would then be pointed at the selected area during the relevant section of the satellite orbit. The model generated through the star tracker 34 also permits a number of offsets to be calculated to enable open-loop pointing of the antennas 16a, 16b (and gateway antennas 20a-20c) that may be adjusted in orientation relative to the satellite body 34.

Satellite Orbit Control

The present invention advantageously is able to employ a life extension strategy which can minimising satellite fuel use. In the known art, particularly for GEO systems, the satellites have a tendency to deviate from their desired orbital position with respect to the Earth. Satellite fuel has to be regularly expended though small rocket thrusters to correct the changes in momentum and to maintain the precise orbital locations that are required.

For many non-GEO satellite communication systems, there is also an implied requirement to ensure the satellites "rise and set" in a predictable and repeatable manner. This simplifies user terminal operation and frequency coordination with other satellite systems. It is therefore necessary for the satellites to periodically expend fuel to achieve the necessary orbital repeatability.

However, the inventors of the present invention have acknowledged, for the first time, that it acceptable to allow the satellite orbits to vary slightly with respect to the Earth over time. This is because, in non-limiting embodiments, the precise location of each satellite 12 within the network 10 is not critical since, with at least four orbital planes of satellites, at least two satellites will be in view for any one user at any one point.

This has two main advantages. The first is that the satellites 12 do not need to be delivered to orbit in precisely regulated orbital spacings with respect to one another, because the network 10 can handle satellites 12 having unequal spacing within each orbital plane.

Further, because the precise spacing is not critical, the fuel required for station keeping is reduced, reducing the cost of the satellites 12 and increasing the useful time that the satellite can remain in orbit.

By providing such a pseudo random spacing of the satellites 12 within and between orbital planes (from delivery and/or through allowing the satellite orbits to evolve naturally), the deployment and maintenance costs of the network can be reduced.

Another advantage of the present invention is that, as described above, the same portion of RF spectrum (i.e. 2.5 GHz of the Ka band) may be reused and shared by other operational satellite communication systems. The inventors of the present invention have provided, for the first time, a multi-plane MEO communications satellite network 10 that achieves acceptable standards of spectrum sharing with existing systems.

While the principle of operating a group of satellites spaced equally within an orbital plane is known, operation of the satellite constellation 10 of the present invention will have to cope with a number of specific operational issues. For example, in the conventional art, in the event that a satellite 12-1 in an orbital plane were to fail, all of the satellites 12-1, 12-2 in that orbital plane have to be repositioned to restore an acceptable service.

However, because the operational system is designed to handle pseudo random spacings of satellites 12, equal spacing of satellites 12 in any given orbital plane is not required in the case of the present invention. Furthermore, satellites 12 in neighbouring orbital planes may be positioned such that GEO crossings do not occur sequentially.

Nevertheless, even though satellite orbits are allowed to evolve naturally, the satellite motion is largely deterministic and system computations can provide accurate predictions of the relative position of all the satellites 12 in the constellation 10 and their GEO and LEO neighbours.

In addition to adjustment of the satellite 12 attitude in space, the antennas 16a, 16b are adjustable to provide the correct separation between the user areas A, or A and B illuminated by each antenna 16a, 16b and to enable fine positional adjustments.

In addition, if it is necessary to address particular aspects of satellite drift and disturbance, the present invention is operable to address this in a unique manner. In general, satellite drift and satellite attitude disturbances are mostly cyclic in nature. A common way to address this issue is to use momentum/reaction wheels to compensate. The skilled person would be readily aware of the types of such systems which are well known and commercially available and these will not be discussed any further here.

However, a significant technical problem with the use of electrically powered wheels to force a satellite or other spacecraft to turn in a particular direction is that the wheels cannot provide a continuous, fixed bias. Consequently, starting from rest, a wheel may gently move back and forth in response to disturbance torques. Should there be a requirement for a continuous "push", then the wheel has to rotate faster and faster.

At some point the wheel has to be slowed. It is generally at this point when attitude thrusters on the satellite or spacecraft have to be used to offset the momentum built up has built up in the wheel.

An advantage of approach of the present invention is that, in order to minimise the fuel usage addressing this unwanted momentum entails is to permit the satellite to drift naturally. Whilst this is not acceptable for GEO satellites (which must remain within a tightly controlled orbit and spatial location), this may be acceptable for MEO satellites forming part of the present invention, reducing the cost of the spacecraft and increasing the useful time that the satellite can remain in orbit. In the present embodiment, satellite drift is not critical since, with at least four orbital planes of satellites, at least two satellites will be in view at any one point.

However, in non-limiting embodiments, this problem can be addressed through yaw reversal. In essence, the satellite is rotated periodically in yaw to be "upside down" to offset the build-up of momentum. The inventors of the present application have recognised, for the first time, that this approach can be used to effectively control build-up of momentum in a satellite and reduce fuel consumption. This has the technical advantage of providing lower operating costs due to the benefits of either a lower launch weight (due to reduced fuel requirements) and/or a longer service life in orbit.

User Terminal Operation and User Terminal Antenna Control

In embodiments of the present invention, it is desired that the user terminals are relatively effort-free in terms of use. This is so that the system can emulate other, out-of-the-box systems such as wireless internet, 4G data and wifi connectability, for example.

Figure 15:
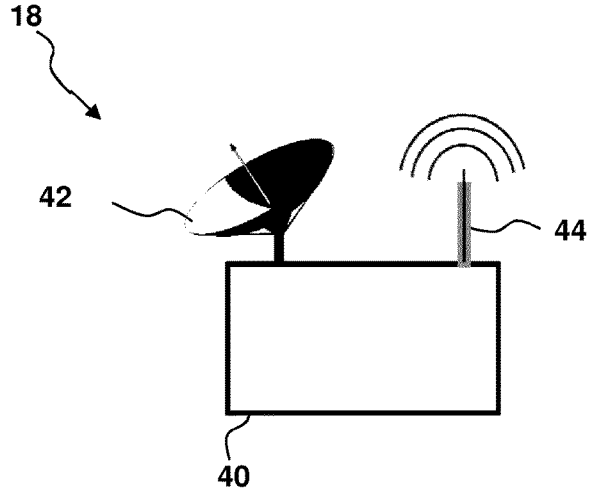
FIG. 15 is a schematic diagram of an exemplary user terminal.

It is desired that a user terminal 18 can locate and follow a visible satellite 12 without any user intervention. A general schematic of a user terminal 18 is shown in FIG. 15.

The user terminal 18 comprises a housing 40. The housing 40 may comprise one or more processors (not shown) or other communication processing equipment as is required. The housing 40 may also have connections to enable computing devices such as personal computers or tablets to be connected to the user terminal 18 (and thereby the internet) by wired or wireless means.

The user terminal 18 further comprises a high gain antenna 42 which is movable and/or rotatable in at least two orthogonal planes in order to enable tracking of a visible satellite 12. The antenna 42 is movable by means of a motor drive (not shown) or other drive device and is controllable by the processor. The single high-gain antenna 42 is highly directive and is used for both reception and transmission. This configuration, in conjunction with the narrow beamwidths from the satellites 12, permits very high degrees of frequency reuse through spatial diversity.

The user terminals 18 may be remote, or difficult to reach for fixed line services, but will be concentrated within particular regional areas, such as a growing city and its environs. The orbital arrangement of the present invention also permits a high-speed connection to be established to a user without recourse to a high-gain tracking antenna that would have to cope with angular rates of about 5 degrees per minute, which would be the case in a LEO system.

In contrast, the antenna 42 of the user terminal 18 may be open-loop pointed to a satellite of choice, similar to the Go-To function on an amateur astronomical telescope mount.

Fine pointing of satellite antennas in known arrangements can be controlled by a separate tracking antenna that works with a beacon transmitting from within the coverage area. Alternatively a closed-loop system may be employed that monitors the quality of the signal in a number of user terminals scattered across the user area. This enables a statistical model to be created of the actual beam quality and to permit the necessary adjustments to be made on the satellite to ensure the beams stay centred on the user areas selected. Information exchanged between user terminals and the satellite may be carried in a dedicated low data rate Common Signalling Channel (CSC) within the RF spectrum allocation. This channel may be proprietary or conform to the DVBS standard.

However, this arrangement is complex and potentially costly. Instead, the user terminals 18 of the present invention use a technique of managed open-loop control.

Once a terminal 18 has been aligned to be level and facing north, using relatively simple alignment devices in or on the housing 40 (for example, bubble gauges and/or compasses), the terminal 18 can be controlled in an open-loop fashion to follow any point in the sky. Whereas an astronomical telescope may use a fixed table of values for the relative position of objects of interest, the satellites 12 of the present invention are moving, which means that a dynamic model is required.

However, the user terminals 18 can adjust their dynamic model to permit rapid alignment with any of the visible satellites 12. Therefore, it is not necessary for the satellites 12 to expend fuel to control orbital drift, thereby extending satellite lifetime.

User Terminal Operation

During initial set up, the user terminal 18 is placed on a horizontal surface with a clear view of the sky. Ideally this should be down to about 20 degrees above the horizon. This is not essential but maximises the potential terminal performance that can be achieved.

The user terminal 18 also comprises an alignment antenna 44. The alignment antenna 44 is operable to receive data from a low data rate channel of the satellites 12 which, in contrast to the narrow beams 36, 38, is not directional.

The low data rate channel is accessible by all user terminals 18 without special alignment. When first switched on, after initial mechanical installation the user terminal 18 determines its positional coordinates via GPS located within the housing 40. The user terminal 18 then informs the satellite network 10 of the presence of the user terminal 18 using the alignment antenna 44.

Once the network 10 is aware of the presence of the user terminal 18, instructions are provided via the low data rate channel for achieving precise alignment and synchronisation with the appropriate satellite 12 in the constellation.

The alignment may be achieved in one step by following a predetermined search pattern. Additionally or alternatively, this may be achieved in two steps by first locating a known satellite service operating in the GEO arc. This may be more straightforward, since the search only has to be performed in one plane.

Once the known satellite service is located it provides a datum from which the orbital model may be calculated for normal satellite tracking to be performed. This means that the user terminals 18 may be moved or left inactive for long periods but once turned back on the user terminals 18 can receive critical system and orbital model updates. This enables the pointing of the antennas 42 of the user terminals 18 to be adjusted in closed-loop to quickly establish the normal high-speed broadband connection via the spot beams 36, 38.

Removing Faulty Terminals

Unlike satellite TV receive only terminals, satellite broadband terminals 18 are required to transmit as well as receive. This introduces the potential for a malfunctioning terminal 18 to generate interference to other services operating in the same RF band. Should a user terminal 18 fail to maintain the correct communication link with its designated satellite 12 for whatever reason, then it will automatically be shut down. In the event that an unlicensed or unfunded terminal attempts to gain access to the network then it will also automatically be shut down.

Satellite Handover

In GEO systems there is rarely a requirement for handover of the broadband service between different satellites, other than with aircraft and ships. The DVBS standard includes provision for rapid handover in the case of mobile applications delivered from LEO satellites. However, the handover requirement for the present invention is not as demanding as for LEO systems and may use a proprietary or subset of the DVBS synchronisation protocols.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A satellite network for data communication, the network comprising:
a plurality of satellites arranged in medium Earth orbit (MEO) in a plurality of orbital planes such that a plurality of satellites are provided in each orbital plane, each satellite being operable to communicate with one or more terrestrial user terminals and comprising at least one communications antenna operable to generate a spot beam on a predetermined selected terrestrial region to enable said one or more terrestrial user terminals to receive and/or send data via the spot beam, and each satellite being further operable to communicate with at least one terrestrial gateway terminal and further comprising at least one gateway antenna operable to generate a gateway spot beam on a predetermined selected terrestrial gateway region to enable said one or more terrestrial gateway terminals within said gateway region to receive and/or send data via the gateway spot beam, wherein the plurality of satellites is arranged such that the spot beams of at least two satellites are operable to cover substantially the same terrestrial region at any one time, and wherein a plurality of gateway antennas within the network and a plurality of communications antennas within the network are arranged to operate on a same frequency or band of frequencies.

2. A satellite network according to claim 1, wherein the plurality of satellites is arranged such that the spot beams of at least two satellites in at least two different orbital planes are operable to cover substantially the same terrestrial region at any one time.

3. A satellite network according to claim 1, wherein each satellite comprises a plurality of gateway antennas, each gateway antenna being operable to generate a gateway spot beam on a different predetermined selected terrestrial gateway region to enable one or more terrestrial gateway terminals within each of said terrestrial regions to receive and/or send data via the gateway spot beams, said predetermined selected terrestrial gateway regions being spatially separated from one another.

4. A satellite network according to claim 3, wherein each satellite comprises three or more gateway antennas, the gateway antennas being operable to generate at least three gateway spot beams on at least three different and spatially separated predetermined selected terrestrial gateway regions to enable one or more terrestrial gateway terminals within each of said terrestrial gateway regions to receive and/or send data via the gateway spot beams, wherein the terrestrial gateway terminals within any two terrestrial gateway regions are active at any one time.

5. A satellite network according claim 1, wherein each gateway antenna and each communications antenna on a given satellite are configured, in use, to generate spot beams on spatially separated geographical regions.

6. A satellite network according to claim 1, wherein the or each gateway antenna on each satellite is operable to generate a spot beam covering a region having a longest dimension of approximately 50 to 300 km in nadir.

7. A satellite network according to claim 1, wherein the or each communications antenna on each satellite in the network is arranged to operate on the same frequency or band of frequencies.

8. A. satellite network according to claim 7, wherein each satellite further comprises a gateway antenna and the or each gateway antenna on each satellite in the network is arranged to operate on the same frequency or band of frequencies.

9. A satellite network according to claim 8, wherein the or each gateway antenna on each satellite in the network and the or each communications antenna on each satellite in the network is arranged to operate on the same frequency or band of frequencies.

10. A satellite network according to claim 1, wherein the or each satellite in the network is configured to transmit and/or receive data in two different beam polarisations.

11. A satellite network according to claim 9, wherein the polarisations are circular polarisations.

12. A satellite network according to claim 1, wherein the plurality of satellites are provided in four or more orbital planes.

13. A satellite network according to claim 1 wherein the satellites within an orbital plane have an unequal spacing.

14. A satellite network according to claim 13, wherein the satellites within an orbital plane are pseudo-randomly spaced.

15. A satellite network according to claim 1, wherein an angle between two orbital planes is 45 degrees with respect to the polar axis.

16. A satellite network according to claim 1, wherein each of the plurality of satellites is arranged at an orbital altitude of between 17000 -23000 km.

17. A method for satellite communication, comprising:
a) providing a plurality of communication satellites arranged in a medium Earth orbit (MEO) in a plurality of orbital planes such that a plurality of satellites are provided in each orbital plane, each satellite being operable to communicate with at least one terrestrial user terminal:
b) generating, using at least at least one communications antenna on at least one satellite, a spot beam on a selected terrestrial region to enable a user terminal in said selected terrestrial region to receive and/or send data via said spot beam, and
c) generating, using at least at least one gateway antenna on at least one satellite, a gateway spot beam on a selected terrestrial gateway region to enable one or more terrestrial gateway terminals within said gateway region to receive and/or send data via the gateway spot beam, wherein the plurality of satellites is arranged such that the spot beams of at least two satellites are operable to cover the same terrestrial region at any one time, and wherein a plurality of gateway antennas within the network and a plurality of communications antennas within the network are arranged to operate on a same frequency or band of frequencies.

* * * * *